United States Patent Office 3,321,544
Patented May 23, 1967

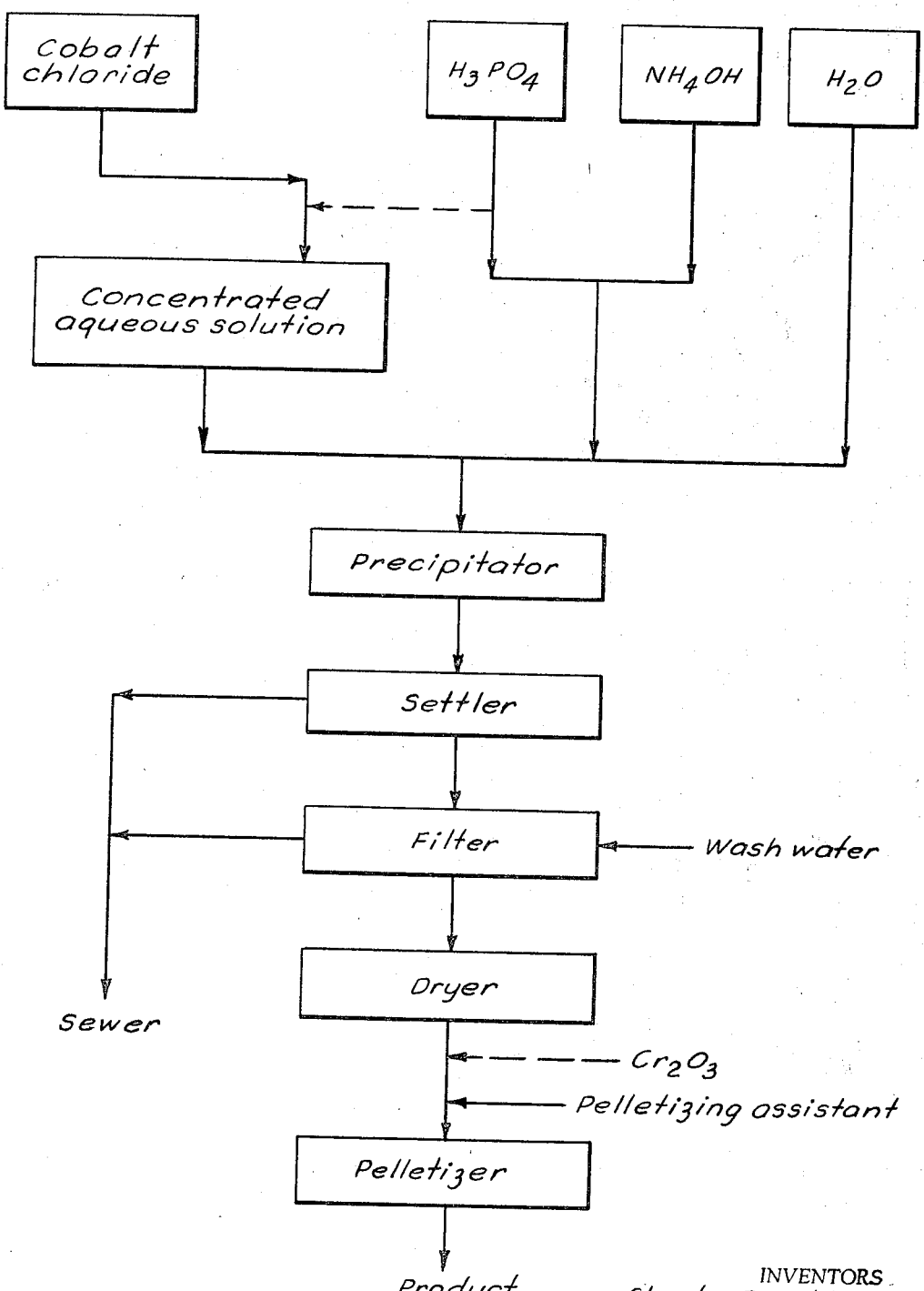

3,321,544
COBALT PHOSPHATE CATALYST AND METHOD FOR DEHYDROGENATING AND CRACKING ALKANES AND OLEFINS
Charles R. Noddings, Midland, and Ronald G. Gates, Breckenridge, Mich., assignors to The Dow Chemical Company, Midland, Mich., a corporation of Delaware
Filed Jan. 6, 1964, Ser. No. 335,902
3 Claims. (Cl. 260—683)

This invention concerns a new catalyst and a process employing the cataylst for the dehydrogenation and cracking of aliphatic hydrocarbons, primarily paraffins and olefins, having three or more carbon atoms in the molecule. It pertains especially to novel catalysts and a process employing the catalyst for the dehydrogenation and cracking of paraffins and olefins having three or more and preferably four carbon atoms in the carbon chain to form by dehydrogenation and/or carbon bond splitting the corresponding unsaturated hydrocarbon, e.g., olefins and dienes as well as the lower carbon chain compounds such as two and three carbon chain compounds, for example, propylene, propane, ethylene, ethane, butene and butadiene when 4 or more carbon atoms are employed, along with dehydrogenated carbon chain compounds having the same number of carbon atoms per molecule as the hydrocarbon starting material.

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter chain length unsaturate products. During such pyrolysis, it is thus evident that several different kinds of reactions usually occur simultaneously, e.g., dehydrogenation, cracking of the carbon-to-carbon linkages in the molecule to form products containing fewer carbon atoms per molecule than the original hydrocarbon, and polymerization of unsaturated hydrocarbons, so that the product is, in most instances, a hydrocarbon mixture. An example of such product is cracked-oil gas, containing paraffinic hydrocarbons ranging in chain length from methane to hexane, olefins ranging from ethylene to hexylene, and a small amount, usually less than 10%, of less saturated hydrocarbons such as butadiene, isoprene, piperylene and acetylenic hydrocarbons. The difficulties involved in recovering the more useful products from such mixture add greatly to their cost.

It is an object of this invention to provide an improved method for the dehydrogenation and/or cracking of $C_3$ and higher hydrocarbons, and particularly $C_4$ and higher hydrocarbons. Another object of the present invention is to provide such a method whereby useful products (that is products other than $CO_2$, carbon and hydrogen) from the pyrolysis (i.e., cracking and/or dehydrogenation) are obtained in quantities which increase the economical value of the products over that of the starting carbon compounds. A further object is to provide a set of operating conditions under which the new catalyst may effectively be used for the foregoing purposes. Other objects will be apparent from the following description of the invention.

We have found that a cobalt phosphate, is, under certain operating conditions, effective in catalyzing the thermal dehydrogenation and/or cracking of $C_3$ hydrocarbons, particularly $C_4$, and higher hydrocarbons, to $C_2$ and $C_3$ hydrocarbons, containing a high proportion of olefins.

The catalyst is prepared by mixing together water-soluble metal salts of cobalt with a water-soluble form of the ortho-phosphate moiety ($PO_4^\equiv$) in an aqueous medium under conditions such that the pH is within the range of from 5 to 9. Further, while not critical, but desirable, the phosphate moiety is employed in a slight excess over that which is theoretically necessary to combine with the metal ions to form a metal ortho-phosphate. It is to be understood that the pH may, but does not have to be maintained within the operative range during mixing but can be adjusted, after mixing, by addition of a base or acid as necessary to the reaction mixture to bring the solution within the desired range thereby causing precipitation of a catalytic material.

The contacting and mixing of the reactants in accordance with the above recitation can be carried out in several manners, such as simultaneously, stepwise or intermittently, each in either a batchwise or continuous manner.

Examples of salts which may be used as starting materials in preparing the catalyst are the chlorides, bromides, nitrates, and acetates, etc., of cobalt. Examples of soluble phosphates that may be employed as starting materials are disodium phosphate, trisodium phosphate, dipotassium phosphate, di-ammonium phosphate, etc.

The catalyst can also be prepared in either a batchwise manner or a continuous manner by feeding separate streams of an alkali, preferably aqueous ammonia, although other alkalis can be employed as well as combinations of two or more alkalis, and as either a single or as a separate stream an aqueous solution of cobalt salts, and either a separate or as a part of any one of the aforesaid streams a dissolved ortho-phosphate, into a reaction chamber. The relative rates of flow are adjusted so that the resultant mixture will achieve continuously or upon completion of the mixing a pH between 5 and 9. It is desirable in a continuous or stepwise operation to retain within the reaction zone a portion of the cobalt phosphate which forms and precipitates. This is conveniently achieved by adjusting the outflow of the cobalt phosphate precipitated to retain a portion of the flocculent material which settles rapidly to form, as a lower layer of the resultant mixture, an aqueous cobalt phosphate slurry that contains 2% by weight or more, usually from 7.5 to 10%, of the cobalt phosphate. The reaction mixture, or preferably the settled lower layer thereof, may be filtered to obtain a filter cake which contains 10% or more, usually about 22%, of the cobalt phosphate.

In order to obtain a rapid settling cobalt phosphate of good catalytic activity, it is important that the two or more streams of the above-mentioned starting materials flow into admixture with one another, e.g., within a body of the resulting mixture, at relative rates such as to maintain the resultant mixture at a pH value between 5 and 9. The phosphate precipitated from a mixture of higher pH value which is then adjusted to about 5 to 9 is of good catalytic activity, but is extremely slow in settling. The phosphate precipitated from a mixture of pH value below 5 settles rapidly, but is less active as a catalyst for the cracking and dehydrogenation of $C_4$ hydrocarbons than is phosphate precipitated from mixtures within the range of 5 to 9 pH values. It also appears necessary, in order to obtain a cobalt phosphate product of rapid settling rate, that a portion of the precipitated phosphate be retained in the mixing and reaction zone so that, once the process is started, the catalyst is being formed and precipitated in the presence of a slurry of the cobalt phosphate. It is probable that the catalyst already precipitated serves as nuclei for precipitation of further amounts of catalytic material and aids in controlling the particle size and physical form of the material undergoing precipitation, but the invention is not restricted to this theory as to a reason for the result obtained. Presence of preformed particles of catalyst during precipitation of further amounts of the latter is not, of itself, sufficient to cause formation of a rapid settling product, i.e., it is also necessary that the reaction mixture as a whole be maintained at an average pH value of between 5 and 9.

The procedure in bringing the two streams of starting materials together and admixing them also has an influence on the rate of settling of the catalyst which is precipitated. It is desirable that the points of feed, to the aqueous mixture in the mixing chamber, of the streams of the two starting materials be remote from one another and that the mixture be stirred, or otherwise agitated, during introduction of the starting materials. Usually, inlets for the different kinds of starting materials are separated by a distance of a foot or more. Either starting material may, of course, be introduced through a plurality of inlets. It is probable that these precautions of separating the points of feed of the different starting materials and of agitating the mixture result in actual contact between the starting materials in a zone, or zones, of approximately the pH value which is average for the mixture as a whole, i.e., the procedure just recommended presumably results in formation and coagulation of cobalt phosphate in zones which are actually at pH values between 5 and 9. It will be understood that the minimum distance between points of feed of the different starting materials is dependent in part upon the rates of feed, and that it may be less with low rates of feed than with high rates of feed. An increase in the degree, or efficiency, of stirring of the mixture will also permit a decrease in minimum distance between the points of feed. In actual manufacture of the phosphate, the points of feed of starting materials may advantageously be separated by a distance of 5 feet or more.

Usually water is employed as the solvent for the starting materials, but other ionizing solvents, e.g., aqueous alcohol, may in some instances be used.

In any event after the reaction is complete the precipitate is separated from the liquor by filtration or decantation and is washed with water decanting or filtering after each washing. The washing should be carried out so as to remove as thoroughly as possible readily soluble compounds from the product, since such impurities have a disturbing and erratic action on the thermal decomposition of hydrocarbons. Of particular attention are the unreacted chlorides or byproduct chlorides which, if retained in the catalyst, tend to deactivate the latter. The catalyst is, at this stage in its preparation, a solid or gel-like substance which is apparently amorphous.

After being washed with water, the product is dried, usually at temperatures between 60° and 150° C. The dried product is a hard gel usually of purplish color. The gel may be crushed or otherwise reduced to granules, or small lumps, and be used directly as a dehydrogenation catalyst. However, it is preferably pulverized, e.g., to a particle size capable of passing a 28-mesh screen, and the powdered product is treated with a lubricant and is pressed into the form of pills, tablets, or granules of size suitable for use as a catalyst, e.g., into the form of tablets of from $\frac{1}{16}$ to $\frac{1}{2}$ inch diameter. The lubricant serves to lubricate the particles during the operation of pressing them into pills and its use permits the formation of pills of greater strength and durability than are otherwise obtained. As the lubricant we preferably use a substance capable of being removed by vaporization or oxidation from the product, e.g., a substance such as graphite, a vegetable oil, or a hydrocarbon oil, etc.

$C_4$ and higher hydrocarbons can be cracked and dehydrogenated in the presence of steam and the catalyst of the present invention at temperatures between 600° and 750° C., and in some instances at temperatures as much as 50° C. below or above this range. The reaction is advantageously carried out at temperatures between 650° and 700° C.

Except for the foregoing limitations, the conditions under which the dehydrogenation reaction is carried out may be varied widely. Also, the method is operable at atmospheric, subatmospheric, or at superatmospheric pressures, provided the hydrocarbon reactant is in vaporized form. In some instances, the yield of dehydrogenated product decreases upon increase of the reaction pressure above atmospheric. However, the ability to operate at an increased pressure is of considerable advantage, since condensation of the reaction products may thereby be facilitated. In general, the proportion of the hydrocarbon reacted and also the amount of byproduct formation per pass through the catalyst bed tend to decrease with increase in the rate of vapor flow, and vice versa.

In producing cracked and dehydrogenated hydrocarbon products in accordance with the invention, a reaction chamber is charged with the granular catalyst and the lubricant employed is removed from the catalyst. This is usually accomplished by passing an $O_2$-containing gas such as oxygen or air, preferably a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas or vapor such as steam, nitrogen, or carbon dioxide over the catalyst so as to vaporize at least a portion of the binding agent from the catalyst granules.

After freeing the catalyst of the lubricant, the catalyst bed is swept free of the $O_2$ or air with steam and is heated to the desired reaction temperature, preferably by passing superheated steam through the same. A mixture of steam and the hydrocarbon reactant, e.g., propene, propane, butylene, amylene, hexylene, butane, pentane, or hexane, having at least three carbon atoms, is then passed through the catalyst bed at a temperature between 600° and 750° C., and preferably between 650° and 700° C. The usual procedure is to pass the hydrocarbon gas into admixture with steam which has been superheated to 750° C. or above, i.e., to a temperature sufficient so that the resultant mixture is at the desired reaction temperature, and to pass the mixture through the bed of catalyst. However, the heat may be supplied in other ways, e.g., by forming the steam and hydrocarbon mixture at a lower temperature and passing the mixture through a preheater to bring it to the desired temperature, or by externally heating the catalyst chamber itself. The yield of olefins is usually highest when from 10 to 20 volumes of steam are employed per volume of the gaseous or vaporized hydrocarbon, but the steam may be used in smaller or larger proportions if desired. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters pressure) per liter of catalyst bed per hour.

The vapors issuing from the catalyst chamber are ordinarily passed through heat exchangers and other cooling devices to condense first the water and then the hydrocarbon products. By repeatedly recycling the unreacted hydrocarbons an olefin product may be produced in a 60 percent yield or higher and usually in a yield of from 70 to 75 percent of theoretical or higher.

During use in the process, the catalyst gradually accumulates a small amount of carbon, or non-volatile organic material, and loses its activity. Accordingly, flow of the hydrocarbon starting material is periodically interrupted and air, admixed with the steam, is blown through the catalyst bed, e.g., at temperatures between 450° and 700° C., and preferably at the dehydrogenating temperature, to oxidize and remove the carbonaceous or organic material and thus reactivate the catalyst. Usually from 10 to 30 minutes is required to carry out this reactivation step. However, if, during compounding of the catalyst into tablet form, an agent having the property of catalyzing the oxidation of carbon is admixed therewith, the time subsequently required for reactivating the catalyst with steam and air may be reduced markedly. For instance, the incorporation of one or two percent of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of hydrocarbons, together with the steam, is resumed. Usually, reactivation of a catalyst is advisable after from 15 to 60 minutes of use in the dehydrogenation reaction. In practice, two or more catalyst chambers are preferably employed in a system provided with connections for passing the reaction mixture alternately through different catalysts beds. One catalyst bed is usually employed in the dehydrogenation reaction while another is being reactivated. By operating in this manner, the dehydrogenation reaction may be carried out continuously.

The following example illustrates the present invention, but is not to be construed as limiting.

*Example 1*

In the manner shown in the accompanying drawing 11 gram moles of cobalt nitrate as a 23 weight percent aqueous solution thereof was mixed in a vessel with 7.56 gram moles of phosphoric acid as a 75.5 weight percent aqueous solution and the resulting mixture is diluted with water to a total volume of 47.4 gallons. Upon completion of the addition of the above enumerated chemicals to the vessel reactor, an aqueous 12.6 weight percent ammonium hydroxide solution was, or had been, added. In some instances, the aqueous ammonium hydroxide was added together with the reactants, in others after addition of all of the reactants, and in still others the phosphoric acid and ammonia were first mixed and then admixed with the other reactants. The reaction mass was continuously stirred and base or acid added to produce and maintain a pH of the system between 6 and 6.5. In the specific instance 22.7 gram moles of ammonium hydroxide were required to maintain the pH at 6.2 at the end of 2.5 hours of reaction. The reaction was considered complete when the final pH remained constant. Thereafter the reaction mass was allowed to settle overnight after which the supernatant liquid above the precipitate was drawn off (approximately 45 gallons decanted) and the resulting thick slurry filtered. The filtrate was discarded. The unwashed cake was then removed and dried at 100° C. in a rotary drier. The dry powder was recovered, was crushed, mixed with about 2% by weight of a lubricant grade graphite and expressed into pellets about ¼ inch in diameter and ¼ inch long. The graphite was burned off by treating the pellets with air and steam at about 650° C. for about 6 hours. The resulting catalyst pellets were tested as cracking catalyst at 700° C., 150 v./v. hr. (volumes of gas per unit volume of catalyst per hour) (S.T.P.) with 99% n-butane, 3000 v./v. hr. of steam and 1.0 hr. cycle, one-half of which was a regeneration using 85 v./v. hr. of air and 3000 v./v. hr. steam at the reaction temperature through the catalyst bed. Of the butane fed to the reactor there was obtained a conversion of 14.5% and a yield 86.5% of $C_2H_4$ (38%) and $C_3H_6$ (48.5%). All yields are based on the carbon content of the amount of butane converted.

We claim:

1. The method which comprises dehydrogenating and cracking an aliphatic hydrocarbon having at least 3 carbon atoms by passing the hydrocarbon together with steam at a temperature between 600° and 750° C. in contact with a catalyst composed of a metal phosphate material consisting essentially of phosphate radicals chemically combined with cobalt, which metal phosphate material is preparable by mixing a solution of soluble salts of cobalt with a solution of a soluble ortho-phosphate and precipitating said metal phosphate material from the mixture at a pH of between about 5 to 9.

2. The method of claim 1 which comprises passing hydrocarbon vapors containing a paraffin having 4 carbon atoms and between 10 and 20 volumes of steam into contact with the catalyst.

3. The method of claim 1 which comprises passing hydrocarbon vapors containing a normal butane into admixture with between 10 and 20 volumes of steam.

References Cited by the Examiner

UNITED STATES PATENTS

| | | | |
|---|---|---|---|
| 2,304,083 | 12/1942 | Ruthruff | 252—437 |
| 2,466,340 | 4/1949 | Van Atta et al. | 260—405.5 |
| 2,542,813 | 2/1951 | Heath | 252—437 |
| 2,561,787 | 7/1951 | Denton et al. | 260—465.3 |
| 2,704,747 | 3/1955 | Bielawski | 252—437 |
| 3,205,181 | 9/1965 | Bowman et al. | 252—437 |

OTHER REFERENCES

Chemical Abstracts, vol. 33, column 1864[4] (abstract of: "Effect of pH Value in Solubility of Cobalt Phosphate, Askew, H. O., New Zealand J. Sci. Tech., 20A, 106–109, 1938).

DELBERT E. GANTZ, *Primary Examiner.*

R. H. SHUBERT, *Assistant Examiner.*